(12) United States Patent
Johansson et al.

(10) Patent No.: US 9,973,954 B2
(45) Date of Patent: May 15, 2018

(54) METHOD AND DEVICE FOR MINIMIZING DRIVE TEST LOGGING MEASUREMENT

(75) Inventors: Johan Johansson, Kungsaengen (SE); Hongzhuo Zhang, Shanghai (CN); Dongmei Zhang, Beijing (CN); Lei Jin, Nanjing (CN); Ying Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 13/328,627

(22) Filed: Dec. 16, 2011

(65) Prior Publication Data

US 2012/0088457 A1 Apr. 12, 2012

Related U.S. Application Data

(63) Continuation of application No. PCT/CN2010/073925, filed on Jun. 13, 2010.

(30) Foreign Application Priority Data

Jun. 18, 2009 (CN) .......................... 2009 1 0139467

(51) Int. Cl.
*H04W 24/10* (2009.01)
*H04W 8/24* (2009.01)
*H04W 16/18* (2009.01)

(52) U.S. Cl.
CPC ..... *H04W 24/10* (2013.01); *G06F 2221/2101* (2013.01); *H04W 8/24* (2013.01); *H04W 16/18* (2013.01)

(58) Field of Classification Search
CPC ................ H04W 16/18; H04W 64/00; H04W 24/00–24/10

(Continued)

(56) References Cited

U.S. PATENT DOCUMENTS

| 5,819,177 A | 10/1998 | Vucetic et al. | |
| 6,044,270 A * | 3/2000 | Raith | H04W 36/0088 455/434 |

(Continued)

FOREIGN PATENT DOCUMENTS

| CN | 1719918 A | 1/2006 |
| CN | 1984471 A | 6/2007 |

(Continued)

OTHER PUBLICATIONS

Extended European Search Report received in Application No. 13166485.6-1857, Applicant: Huawei Technologies Co., Ltd., dated Jun. 18, 2013, 10 pages.

(Continued)

*Primary Examiner* — Gennadiy Tsvey
(74) *Attorney, Agent, or Firm* — Slater Matsil, LLP (57) ABSTRACT

Embodiments of the present invention provide a Minimizing Drive Test (MDT) logging measurement method and device. The method includes: generating MDT logging measurement configuration information; and sending the MDT logging measurement configuration information to an active User Equipment (UE) and/or an idle UE according to a predetermined rule. Through the solutions provided in the embodiments of the present invention, a commercial UE in an existing network may be utilized to assist in locating a network problem, thus reducing a Drive Test (DT) overhead.

20 Claims, 3 Drawing Sheets

(58) Field of Classification Search
USPC .............................................. 455/67.11, 423
See application file for complete search history.

(56) References Cited

U.S. PATENT DOCUMENTS

| | | | |
|---|---|---|---|
| 6,445,917 B1* | 9/2002 | Bark et al. ................... | 455/423 |
| 9,143,947 B2* | 9/2015 | Bodog ................ | H04W 16/18 |
| 2004/0131026 A1* | 7/2004 | Kim et al. .................... | 370/328 |
| 2004/0203437 A1* | 10/2004 | Burch et al. ............... | 455/67.11 |
| 2005/0111410 A1* | 5/2005 | Bazar ........................... | 370/331 |
| 2005/0130675 A1* | 6/2005 | Burch et al. ............... | 455/456.5 |
| 2005/0251363 A1 | 11/2005 | Turner et al. | |
| 2006/0128371 A1* | 6/2006 | Dillon et al. ................. | 455/423 |
| 2006/0276183 A1* | 12/2006 | Quick et al. ............... | 455/414.1 |
| 2008/0026748 A1* | 1/2008 | Alexander ........... | H04W 24/06 455/432.1 |
| 2008/0132225 A1* | 6/2008 | Ranta ................... | H04J 11/0093 455/424 |
| 2008/0253332 A1* | 10/2008 | Ore ..................... | H04J 11/0069 370/331 |
| 2008/0293423 A1* | 11/2008 | Park ..................... | H04L 1/0026 455/450 |
| 2009/0005119 A1* | 1/2009 | Patel .................... | H04W 24/10 455/562.1 |
| 2009/0011768 A1* | 1/2009 | Seok ................... | H04L 41/5003 455/450 |
| 2009/0042559 A1* | 2/2009 | Choi ..................... | H04W 24/10 455/423 |
| 2009/0075648 A1 | 3/2009 | Reed et al. | |
| 2009/0149170 A1* | 6/2009 | Kazmi ................. | H04L 1/0029 455/422.1 |
| 2009/0170441 A1* | 7/2009 | Eckert ................... | H04W 24/10 455/67.11 |
| 2009/0253458 A1* | 10/2009 | Dillinger ............... | H04W 24/10 455/552.1 |
| 2011/0026506 A1* | 2/2011 | Macnaughtan ....... | G01S 5/0236 370/338 |
| 2011/0045780 A1* | 2/2011 | Ben Hadj Alaya ... | H04W 24/10 455/67.11 |
| 2011/0081868 A1* | 4/2011 | Kim ..................... | H04W 24/10 455/67.11 |
| 2011/0201279 A1* | 8/2011 | Suzuki ................. | H04W 24/10 455/67.11 |
| 2011/0281583 A1* | 11/2011 | Hole ................. | H04W 36/0055 455/436 |
| 2011/0281601 A1* | 11/2011 | Ahn ........................ | H04W 8/24 455/500 |
| 2012/0004010 A1* | 1/2012 | Tamura ................ | H04W 24/10 455/525 |
| 2012/0044880 A1* | 2/2012 | Sun ..................... | H04W 72/1242 370/329 |
| 2012/0282968 A1* | 11/2012 | Toskala ................ | H04W 24/10 455/517 |
| 2013/0021940 A1* | 1/2013 | Keskitalo .......... | H04W 36/0088 370/252 |
| 2013/0208610 A1* | 8/2013 | Mach ................... | H04W 24/10 370/252 |

FOREIGN PATENT DOCUMENTS

| | | |
|---|---|---|
| CN | 101060689 A | 10/2007 |
| CN | 101222754 A | 7/2008 |
| CN | 101420711 A | 4/2009 |
| RU | 2196392 C2 | 1/2003 |
| WO | WO 2001/059936 A2 | 8/2001 |
| WO | WO 2004/079928 A2 | 9/2004 |
| WO | WO 2006/063309 A2 | 6/2006 |
| WO | WO 2008/039872 A2 | 4/2008 |

OTHER PUBLICATIONS

Extended European Search Report received in Application No. 13166478.1-1857, Applicant: Huawei Technologies Co., Ltd., dated Jun. 18, 2013, 11 pages.
Russian Office Action received on Patent Application No. 2011153700, dated Jul. 17, 2013, 23 pages.
Chinese Office Action and partial translation received in Chinese Patent Application No. 200910139467.3, dated Jun. 4, 2012, 11 pages.
European Search Report received in European Patent Application No. 10788927.1, dated Jun. 8, 2012, 11 pages.
Russian Office Action and partial translation received in Russian Patent Application No. 2011153700, dated Feb. 27, 2012, 5 pages.
Catt, "UE Measurements and Logs for Mobility Optimization," 3GPP TSG-RAN WG2 Meeting #66, R2-092988, San Francisco, CA, US, May 4-8, 2009, 4 pages.
Motorola, "Measurements Supporting Minimisation of Drive Test Use Cases," 3GPP TSG-RAN2 Meeting #66, R2-093208, San Francisco, CA, US, May 4-8, 2009, 8 pages.
Telecom Italia, "Preliminary Analysis on Use Cases and UE Measurements for Minimisation of Drive Tests," 3GPP TSG-RAN WG2 #65bis, R2-092435, Seoul, Korea, Mar. 23-27, 2009, 4 pages.
Teliasonera, "Possible Measurements for Minimising Drive Tests," 3GPP TSG-RAN WG2 #65bis, R2-092024, Seoul, Korea, Mar. 23-27, 2009, 2 pages.
3$^{rd}$ Generation Partnership Project, "Technical Specification Group Radio Access Network; Study on Minimization of Drive-Tests in Next Generation Networks; (Release 9)," 3GPP TR 36.805 v1.0.0, Jun. 2009, 10 pages.
Qualcomm Europe, "UE Measurements for Minimizing Drive Tests," 3GPP TSG-RAN WG2 Meeting #65bis, R2-092029, Seoul, Korea, Mar. 23-27, 2009, 8 pages.
Russian Office Action received in Application No. 2011153700/07 dated May 13, 2013, 11 pages.
International Search Report and Written Opinion received in Patent Cooperation Treaty Application No. PCT/CN2010/073925, dated Sep. 23, 2010, 8 pages.
"3rd Generation Partnership Project; Technical Specification Group Radio Access Network; Study on Minimization of Drive-Tests in Next Generation Networks; (Release 9)," 3GPP TR 36.805 V1.1.0, Jun. 2009, 15 pages.
"3rd Generation Partnership Project; Technical Specification Group Radio Access Network; Evolved Universal Terrestrial Radio Access (E-UTRA) Radio Resource Control (RRC); Protocol Specification (Release 8)," 3GPP TS 36.331 V8.5.0, Mar. 2009, 204 pages.
Holma, H. et al., "WCDMA for UMTS, The Radio Resource Control Protocol," WCDMA for UMTS: Radio Access for Third Generation Mobile Communications, Chichester: John Wiley & Sons, GB, XP002254288, ISBN: 978-0-471-48687-9, Jan. 1, 2001, 18 pages.

* cited by examiner

ID_METHOD AND DEVICE FOR MINIMIZING DRIVE TEST LOGGING MEASUREMENT

CROSS-REFERENCE TO RELATED APPLICATIONS

This application is a continuation of International Application No. PCT/CN2010/073925, filed on Jun. 13, 2010, which claims priority to Chinese Patent Application No. 200910139467.3, filed on Jun. 18, 2009, both of which are hereby incorporated by reference in their entireties.

FIELD OF THE INVENTION

The present invention relates to the field of wireless communication technologies, and in particular, to a method and device for Minimizing Drive Test (MDT) logging measurement.

BACKGROUND OF THE INVENTION

A Drive Test (DT) is a coverage test, and is a method for measuring wireless network performance by using special professional equipment while driving an automobile along a road. An actual user is simulated in the DT, so as to continuously upload or download files in different sizes, record a logging, employ test software to perform a statistical analysis on the logging, and obtain an index of the network performance. However, additional manpower, measurement tools and transportation vehicles need to be invested in the DT, so an overhead is very high. The foregoing logging may assist in analyzing a reason why a problem occurs by recording and storing event related information.

A User Equipment (User Equipment, UE) of an Evolved-Universal Terrestrial Radio Access Network (Evolved-Universal Terrestrial Radio Access Network, E-UTRAN) already may support measurement related to Long Term Evolution (Long Term Evolution, LTE) Radio Resource Management (Radio Resource Management, RRM), such as mobility (handover) measurement. After UE connection establishment is completed, an Evolved Node B (Evolved Node B, eNB) delivers a measurement configuration message used for management (such as handover) to the UE through a Dedicated Control Channel (DCCH), and the UE performs measurement according to measurement configuration information, and reports a measurement result to the eNB.

The foregoing prior art is applied to RRM, and in the prior art, no solution for using a commercial UE to perform network performance monitoring exists, where the commercial UE refers to a UE used in the DT, rather than the foregoing professional equipment used in the DT.

SUMMARY OF THE INVENTION

According to one aspect, the present invention provides an MDT logging measurement configuration method, including: generating MDT logging measurement configuration information; and sending the MDT logging measurement configuration information to an active UE and/or an idle UE according to a predetermined rule.

According to another aspect, the present invention further provides a system side device, including: a generating unit, configured to generate MDT logging measurement configuration information; and a sending unit, configured to send the MDT logging measurement configuration information to an active UE and/or an idle UE according to a predetermined rule.

According to another aspect, the present invention further provides an MDT logging measurement method, including: receiving MDT logging measurement configuration information; performing MDT logging measurement according to the MDT logging measurement configuration information, and reporting and storing a result of the MDT logging measurement if a UE is active; and performing MDT logging measurement according to the measurement configuration information, and storing a result of the MDT logging measurement if the UE is idle.

According to another aspect, the present invention further provides a UE, including: a receiving unit, configured to receive MDT logging measurement configuration information; a state judging unit, configured to judge whether the UE is active or idle; an MDT logging measuring unit, configured to perform MDT logging measurement according to the MDT logging measurement configuration information; a storing unit, configured to store a result of the MDT logging measurement of the MDT logging measuring unit when the UE is idle/active; and a reporting unit, configured to report the result of the MDT logging measurement of the MDT logging measuring unit when the UE is active.

In the foregoing technical solutions of the embodiments of the present invention, through sending the MDT logging measurement configuration information to the UE, the UE in an existing network may be utilized to assist in locating a network problem, thus reducing a DT overhead, fully utilizing the idle UE to perform the MDT logging measurement, and locating the problem in the network.

BRIEF DESCRIPTION OF THE DRAWINGS

To illustrate the technical solutions according to the embodiments of the present invention or in the prior art more clearly, accompanying drawings needed for describing the embodiments or the prior art are introduced briefly in the following. Apparently, the accompanying drawings in the following description are only some embodiments of the present invention, and persons of ordinary skill in the art may further obtain other drawings from the accompanying drawings without creative efforts.

DETAILED DESCRIPTION OF THE EMBODIMENTS

The technical solutions according to the embodiments of the present invention are described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

Figure 1:
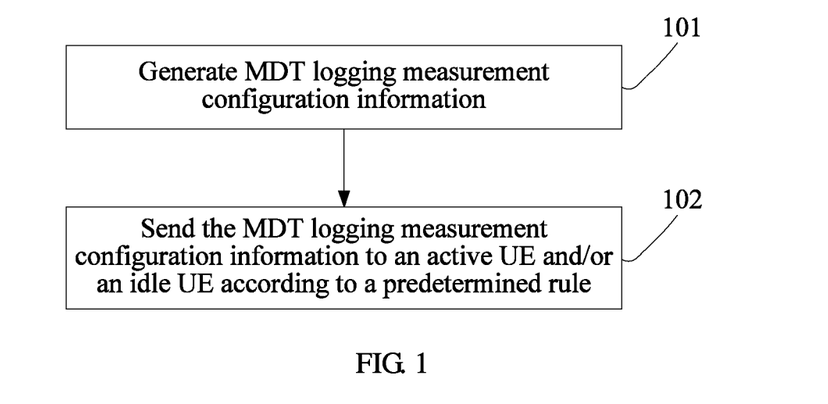
FIG. 1 is a flowchart of an embodiment of an MDT logging measurement configuration method according to the present invention.

FIG. 1 is a flowchart of an embodiment of an MDT logging measurement configuration method according to the present invention, where the method includes the following content.

101: Generate MDT logging measurement configuration information.

102: Send the MDT logging measurement configuration information to an active UE and/or an idle UE according to a predetermined rule.

In the present invention, the MDT may use a commercial UE to assist in measuring network performance, and is mainly used for network coverage optimization, UE mobility optimization, system capacity optimization, and common channel parameter optimization.

Alternatively, the generating the MDT logging measurement configuration information includes: generating a network performance problem value according to current network performance, and generating the MDT logging measurement configuration information according to the network performance problem value. Network performance problems include cases that: a cell handover success ratio is low, a call drop rate is high, a cell capacity deviates far from an ideal value, the UE accesses a cell with a long delay or a low success ratio, and the UE frequently updates a tracing area (TA). The network performance problem value corresponds to the foregoing different network performance problems.

Alternatively, the foregoing predetermined rule includes: sending MDT logging measurement configuration information triggered by system capacity optimization and/or some channel performance optimization reasons to the active UE; or sending the MDT logging measurement configuration information randomly to the active UE and/or the idle UE; or obtaining version information of the active UE and/or the idle UE, and sending the MDT logging measurement configuration information to the active UE and/or the idle UE whose version information conforms to a predetermined version; or obtaining charge level information of the active UE and/or the idle UE, and sending the MDT logging measurement configuration information to the active UE and/or the idle UE whose charge level information conforms to a predetermined charge level; or obtaining measurement state information of the active UE and/or the idle UE, and sending the MDT logging measurement configuration information to the active UE and/or the idle UE, where the active UE and/or the idle UE is not performing MDT logging measurement; or obtaining report history information of the active UE and/or the idle UE, and sending the MDT logging measurement configuration information to the active UE and/or the idle UE whose report history information conforms to the predetermined number of times.

The MDT logging measurement configuration information includes: a logging Identifier (ID), a measurement triggering condition, a measurement variable, and a report variable. Alternatively, the MDT logging measurement configuration information may further include: a measurement stop condition. The MDT logging measurement configuration information is introduced in detail below.

The logging ID is a unique ID of the logging, and is used to distinguish logging measurement caused by different reasons.

The measurement triggering condition includes periodical triggering or event triggering, such as an A/B series event defined in an LTE protocol.

The measurement stop condition includes that: the UE receives a new measurement configuration, or a network instructs the UE to terminate the measurement, for example, because of a load factor, or reasons that the UE has a low charge level and the measurement automatically stops, or the UE cannot normally report, or the UE has no storage space.

The measurement variable includes one or more of the following items: measurement time, a UE location, Reference Signal Received Power (RSRP), a Reference Signal Strength Indicator (RSSI), a UE speed, a UE ID, a Cell-Radio Network Temporary Identifier (C-RNTI) which is allocated by a network cell to the UE, power of a UE emission preamble, the number of Random Access Channel (RACH) attempt times, an RACH failure reason, the number of UpLink Packet Data Convergence Protocol Service Data Units (UL PDCP SDUs) lost before scheduling, a maximum length/average length of a Service Data Unit (SDU) sequence, a maximum delay of SDU scheduling, the number of UL PDCP SDU attempts/successful transmission, a cell search delay, user plane interruption time during handover, an indication that preamble emission power reaches the maximum, an access delay, preamble emission power, a contention resolution indication, path loss estimation, the number of contention resolution times, the number of non-RACH response times, and backoff time.

The report variable includes one or more of the following items: the number of event occurrence times, an event occurrence reason, measurement time, a UE location, RSRP, an RSSI, a UE speed, a UE ID, a C-RNTI, power of a UE emission preamble, the number of RACH attempt times, an RACH failure reason, the number of UL PDCP SDUs lost before scheduling, a maximum length/average length of an SDU sequence, a maximum delay of SDU scheduling, the number of UL PDCP SDU attempts/successful transmission, a cell search delay, user plane interruption time during handover, an indication that preamble emission power reaches the maximum, an access delay, preamble emission power, a contention resolution indication, path loss estimation, the number of contention resolution times, the number of non-RACH response times, and backoff time.

Alternatively, a method for sending the MDT logging measurement configuration information to the UE includes:

For an active UE, the MDT logging measurement configuration information is sent through a connection reconfiguration message of a Radio Resource Control (RRC) protocol, and the connection reconfiguration message may send the MDT logging measurement configuration information to the active UE through a DCCH.

For an idle UE, the MDT logging measurement configuration information may be sent by using the following two manners: (1) a system side device pages the idle UE, and the MDT logging measurement configuration information is delivered to the idle UE by adopting a DCCH; and (2) the system side device broadcasts the MDT logging measurement configuration information, that is, the MDT logging measurement configuration information is delivered to the idle UE on a Broadcast Control Channel (BCCH). It should be noted that, if the idle UE already starts the MDT measurement in a previous active state, and a network side does not stop the measurement yet, the UE may continue to use the previous MDT logging measurement configuration information.

As an embodiment of the present invention, after 102, the method further includes: receiving a result of the MDT logging measurement, where the result of the MDT logging measurement is reported by the UE, transferring the result of the MDT logging measurement to an MDT logging data server so as to enable the MDT logging data server to locate a network problem. The MDT logging data server may be integrated in the eNB, may also be integrated in an Operations, Administration and Maintenance (OAM) entity, and may further be an independent network entity.

Through the foregoing method embodiment, different MDT logging measurement configuration information may be generated, so that the active UE and/or the idle UE may perform the MDT logging measurement according to the MDT logging measurement configuration information.

Figure 2:
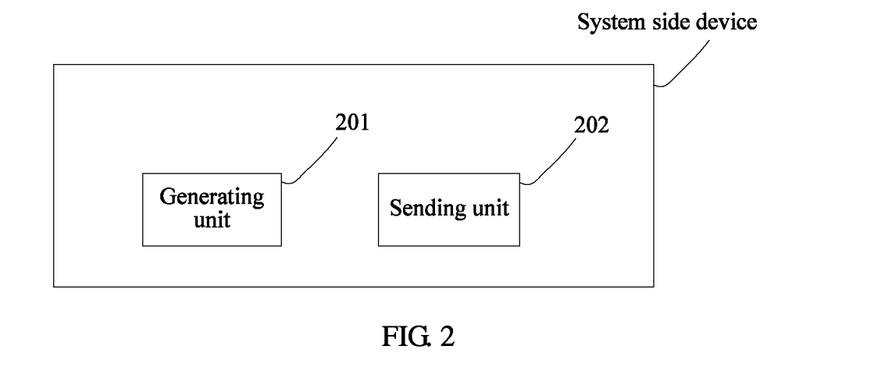
FIG. 2 is a schematic structural diagram of an embodiment of a system side device according to the present invention.

FIG. 2 is a schematic structural diagram of an embodiment of a system side device according to the present invention. The system side device provided in this embodiment includes: a generating unit 201 and a sending unit 202. The generating unit 201 is configured to generate MDT logging measurement configuration information. The sending unit 202 is configured to send the MDT logging measurement configuration information to an active UE and/or an idle UE according to a predetermined rule.

Through the foregoing embodiment, different MDT logging measurement configuration information may be generated, so that the active UE and/or the idle UE may perform MDT logging measurement according to the MDT logging measurement configuration information.

During a specific implementation process, the generating unit 201 may be configured to generate a network performance problem value according to current network performance, and generate the MDT logging measurement configuration information according to the network performance problem value.

Alternatively, the sending unit 202 may be further configured to: send MDT logging measurement configuration information triggered by system capacity optimization and/or some channel performance optimization reasons to the active UE; or send the MDT logging measurement configuration information randomly to the active UE and/or the idle UE; or obtain version information of the active UE and/or the idle UE, and send the MDT logging measurement configuration information to the active UE and/or the idle UE whose version information conforms to a predetermined version; or obtain charge level information of the active UE and/or the idle UE, and send the MDT logging measurement configuration information to the active UE and/or the idle UE whose charge level information conforms to a predetermined charge level; or obtain measurement state information of the active UE and/or the idle UE, and send the MDT logging measurement configuration information to the active UE and/or the idle UE, where the active UE and/or the idle UE is not performing the MDT logging measurement; or obtain report history information of the active UE and/or the idle UE, and send the MDT logging measurement configuration information to the active UE and/or the idle UE whose report history information conforms to the predetermined number of times.

It should be noted that, the generating unit 201 may be integrated in one of the following network elements: an eNB, a network performance monitoring node, and an entity independently existing in a network (such as an MDT logging data server); and the sending unit 202 may be integrated in one of the following network elements: an eNB, a network performance monitoring node, and an entity independently existing in a network (such as an MDT logging data server). The network performance monitoring node includes an OAM entity. During the specific implementation process, for example, the generating unit 201 and the sending unit 202 are both integrated in an eNB, or the sending unit 202 is integrated in an eNB, and the generating unit 201 is integrated in an OAM.

Figure 3:
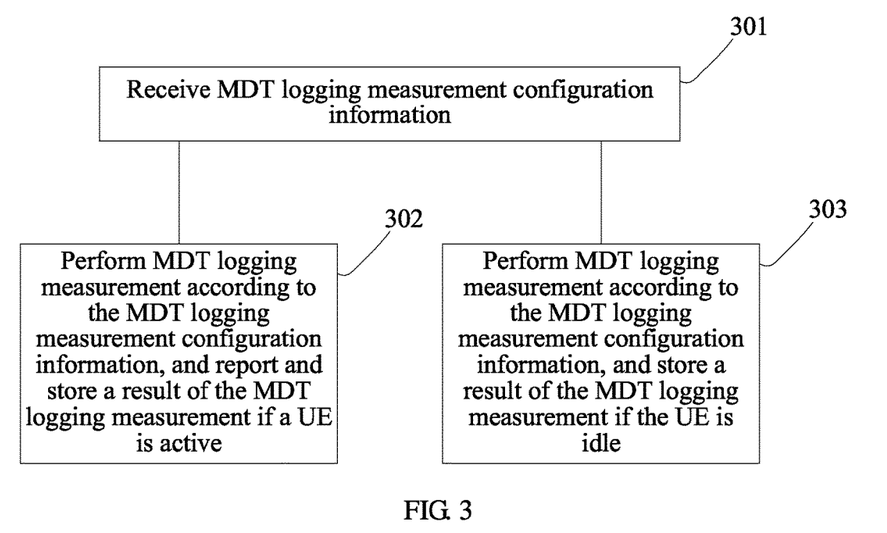
FIG. 3 is a flowchart of an embodiment of an MDT logging measurement method according to the present invention.

FIG. 3 is a flowchart of an embodiment of an MDT logging measurement method according to the present invention.

301: Receive MDT logging measurement configuration information.

302: Perform MDT logging measurement according to the MDT logging measurement configuration information, and report and store a result of the MDT logging measurement if a UE is active.

303: Perform MDT logging measurement according to the measurement configuration information, and store a result of the MDT logging measurement if the UE is idle.

As an embodiment of the present invention, when the UE is active or idle, if MDT logging measurement is not started, the MDT logging measurement configuration information is stored locally, and the MDT logging measurement is performed.

If the MDT logging measurement is already started, the received MDT logging measurement configuration information is used to be instead of old MDT logging measurement configuration information, and the MDT logging measurement is performed.

Alternatively, in the case that the MDT logging measurement is already started, after a current measurement period of the old MDT logging measurement configuration information ends, the received MDT logging measurement configuration information is applied to perform MDT logging measurement.

Alternatively, in the case that the MDT logging measurement is already started, after the measurement of the old MDT logging measurement configuration information ends, the received MDT logging measurement configuration information is applied to perform MDT logging measurement.

As an embodiment of the present invention, the performing the MDT logging measurement according to the MDT logging measurement configuration information, and reporting and storing the result of the MDT logging measurement if the UE is active includes: performing reporting according to a report triggering condition in the MDT logging measurement configuration information, where the condition includes: periodically reporting or a measurement report event condition is met, for example, the number of the measurement reaches a certain value, the time of the measurement reaches a certain number, or the UE service ends, and reporting is performed when the UE is converted between the active state and the idle state, or reporting is performed when an eNB/OAM notifies the active UE of performing the reporting, or reporting is performed when the UE enters/leaves a specific TA, or reporting is performed when the UE enters a specific radio access technology (RAT) communication system, for example, for the idle UE, reporting is performed when the TA is updated, and reporting is performed when the UE is switched into an LTE system or LTE-advanced (LTE-A) system or a High Speed Packet Access (HSPA) system.

Alternatively, when the UE is active, if the UE has no storage space, or the UE receives a request from the OAM/eNB for stopping measurement, or a measurement stop condition is met, or the UE decides to stop measurement, or a charge level of the UE is lower than a preset threshold, the UE stops reporting the result of the MDT logging measurement; and when the UE is idle, if the UE has no storage space, or a measurement stop condition is met, or the UE decides to stop measurement, or the charge level of the UE is lower than the preset threshold, the UE stops storing the result of the MDT logging measurement.

The reporting and storing the result of the MDT logging measurement includes: reporting and storing a logging ID and a measurement result. The logging ID is used to distinguish different logging objectives, such as a coverage detection objective and a channel parameter optimization objective, and the logging ID is associated with the measurement objective at the network side. The measurement result includes a serving cell ID and another cell ID. The measurement variable under the serving cell ID includes time, a location, the number of events, RSRP, RSRQ, a UE speed, and UE emission power. The measurement variable under the foregoing another cell ID includes time, a location, the number of events, RSRP, RSRQ, a UE speed, and UE emission power.

Through the foregoing embodiment, processing may be performed through the active UE and the idle UE respectively, and MDT logging measurement according to a network performance problem value is performed.

Figure 4:
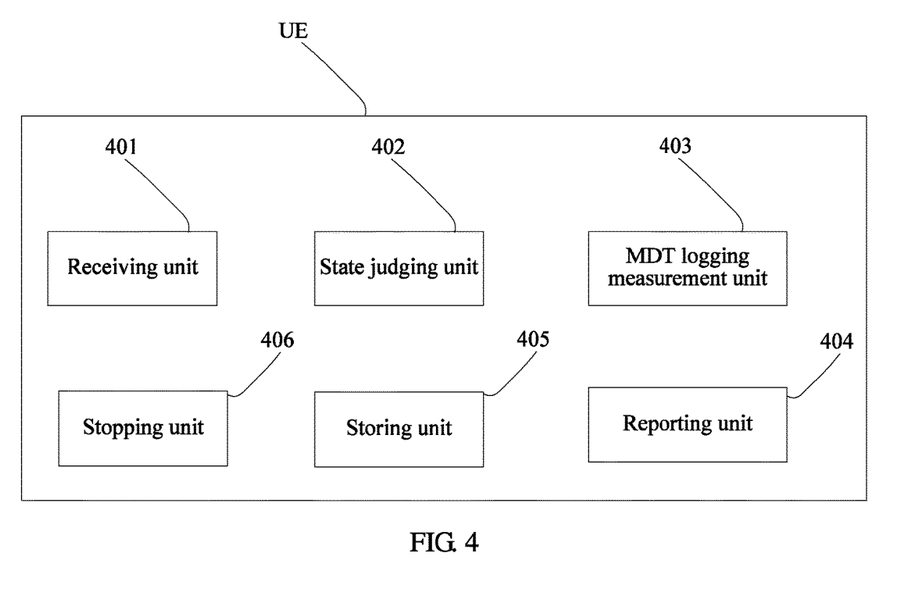
FIG. 4 is a schematic structural diagram of an embodiment of a UE according to the present invention.

FIG. 4 is a schematic structural diagram of an embodiment of a UE according to the present invention. The UE includes: a receiving unit 401, a state judging unit 402, an MDT logging measuring unit 403, a reporting unit 404, and a storing unit 405. The receiving unit 401 is configured to receive MDT logging measurement configuration information. The state judging unit 402 is configured to judge whether the UE is active or idle. The MDT logging measuring unit 403 is configured to perform MDT logging measurement according to the MDT logging measurement configuration information. The reporting unit 404 is configured to report a result of the MDT logging measurement of the MDT logging measuring unit 403 when the state judging unit 402 judges that the UE is active. The storing unit 405 is configured to store the result of the MDT logging measurement of the MDT logging measuring unit.

Through the foregoing embodiment, processing may be performed through the active UE and the idle UE respectively, and MDT logging measurement according to a network performance problem value is performed.

Alternatively, the storing unit 405 is further configured to store the MDT logging measurement configuration information if MDT logging measurement is not started when the UE is active or idle; and use the received MDT logging measurement configuration information instead of old MDT logging measurement configuration information if the MDT logging measurement is already started. The MDT logging measuring unit 403 uses the MDT logging measurement configuration information stored in the storing unit 405 to perform MDT logging measurement.

In the case that the MDT logging measurement is already started, the MDT logging measuring unit 403 may further perform the MDT logging measurement after a current measurement period of the old MDT logging measurement configuration information ends; or the MDT logging measuring unit 403 may further perform the MDT logging measurement after the measurement of the old MDT logging measurement configuration information ends.

Alternatively, the UE in this embodiment further includes a stopping unit 406, configured to stop the reporting unit 404 from reporting the result of the MDT logging measurement when the state judging unit 402 judges that the UE is active, and if the UE has no storage space, or the UE receives a request from an OAM/eNB for stopping measurement, or a measurement stop condition is met, or the UE decides to stop measurement; and stop the storing unit 405 from storing the result of the MDT logging measurement when the state judging unit 402 judges that the UE is idle, and if the UE has no storage space, or the measurement stop condition is met, or the UE decides to stop measurement.

Figure 5:
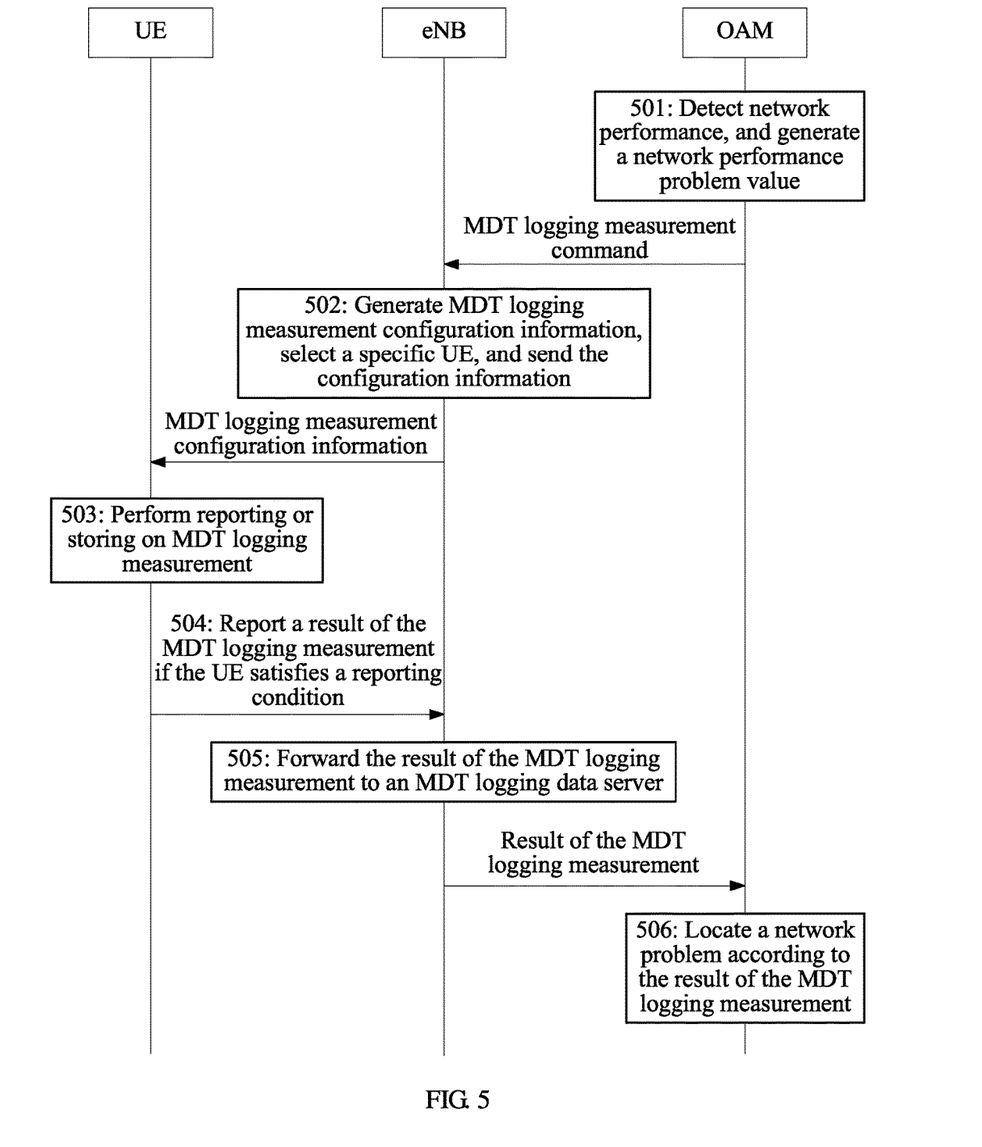
FIG. 5 is a signal flow diagram of an embodiment of MDT logging measurement according to the present invention.

FIG. 5 is a signal flow diagram of an embodiment of MDT logging measurement according to the present invention. In this embodiment, a system side device includes an OAM and an eNB.

501: A network performance monitoring node (such as the OAM) finds that network performance is not ideal, generates a network performance problem value, delivers an MDT logging measurement command to the eNB, and notifies the eNB that MDT logging measurement needs to be started. The network performance problem value corresponds to various cases that the network performance is not ideal, where the various cases include that: a handover success ratio is low, a call drop rate is high, a cell capacity deviates far from an ideal value, an access delay is long or a success ratio is low, the UE frequently updates a TA, and the network performance problem value uses a logging ID to identify different network problems.

502: After receiving the MDT logging measurement command, the eNB generates MDT logging measurement configuration information according to the network performance problem value carried in the MDT logging measurement command, selects a UE, and delivers the MDT logging measurement configuration information to the UE.

During the MDT logging measurement, the UE may not receive or send service data, and in order to reduce an influence of the MDT logging measurement on an ongoing service of an active UE, MDT logging measurement triggered by system capacity optimization or some channel performance optimization reasons is executed by the active UE, and other MDT logging measurement is executed by an idle UE as much as possible.

For example, the following two methods are adopted to select a UE that performs the MDT logging measurement.

1. The eNB randomly selects a UE by performing hash computation on a UE ID.

2. The following state information of a UE is obtained through RRC signaling or predefined signaling, or the UE is selected according to a history record reported by the eNB:

UE version: a UE of a version after an LTE protocol R9 is selected to perform logging measurement;

UE charge level: a UE having a low charge level cannot be selected as a logging UE; and UE reporting history/measurement state: a UE that less reports a result of the MDT logging measurement or a UE that is not performing the MDT logging measurement is selected to perform the MDT logging measurement. Some UEs are prevented from being repetitively selected, so that power consumption of these UEs is not excessively high.

According to a predefined performance item (that is, a measurement item that needs to be performed for the network performance problem value), the MDT logging measurement configuration information is generated, where the MDT logging measurement configuration information of the active UE may be transferred by adopting an RRC reconfiguration message, the MDT logging measurement configuration information is added into a measurement-Configuration parameter, or a measurement configuration message dedicated to the MDT logging measurement configuration information is defined.

The content included in the MDT logging measurement configuration information is the same as the content introduced in the foregoing method embodiment, and details are not repeatedly described here.

The active UE delivers the MDT logging measurement configuration information on a DCCH.

The idle UE may:

(1) If the UE already starts MDT logging measurement in a previous active state, and a network side does not stop the measurement yet, the UE may continue to use previous MDT logging measurement configuration information.

(2) A network pages the UE, and then a method same as that of the active UE is adopted to deliver the MDT logging measurement configuration information.

(3) The MDT logging measurement configuration information is broadcast, that is, the MDT logging measurement configuration information is delivered on a BCCH.

The foregoing 501 to 502 may be respectively performed on an eNB, an OAM, or an entity independently existing in the network.

503: The UE receives the MDT logging measurement configuration information, and judges whether the UE is active or idle; performs corresponding MDT logging measurement according to the MDT logging measurement configuration information, and transfers a result of the MDT logging measurement to the eNB if the UE is active; and performs corresponding MDT logging measurement according to the MDT logging measurement configuration information, and stores a result of the MDT logging measurement locally if the UE is idle.

The UE may further judge whether the current UE already starts the MDT logging measurement, and if the MDT logging measurement is not started, the MDT logging measurement configuration information is stored locally. The UE monitors whether a local environment satisfies an MDT logging measurement triggering condition, and if the measurement triggering condition is satisfied, the MDT logging measurement of the UE is started according to a value of a "measurement variable" in the MDT logging measurement configuration information; if the UE judges that a stop measurement condition is satisfied, the UE stops measurement.

If the UE judges that the MDT logging measurement is already started, three methods for processing the MDT logging measurement configuration information exist: (1) the currently received MDT logging measurement configuration information is used to be instead of an old MDT logging measurement configuration information, the old MDT logging measurement configuration information becomes invalid immediately, and the measurement according to the old MDT logging measurement configuration information is stopped; and a measurement result obtained according to the old MDT logging measurement configuration information is discarded, or reported to the eNB; (2) the old MDT logging measurement configuration information is stored until this measurement period ends, and the currently received MDT logging measurement configuration information becomes valid in a new measurement period; and a measurement result obtained through measurement according to the old MDT logging measurement configuration information is discarded, or reported to the eNB; and (3) after the measurement according to the old MDT logging measurement configuration information ends, the currently received MDT logging measurement configuration information becomes valid.

504: When an MDT logging measurement reporting condition of the UE is satisfied, the UE reports the result of the MDT logging measurement to the eNB.

505: The eNB transparently/non-transparently forwards the result of the MDT logging measurement to an MDT logging data server. In this embodiment, the MDT logging data server is located in the OAM, and as an alternative embodiment, the MDT logging data server may be further located in the eNB, or is an independent entity in the network.

That the eNB transparently forwards the result of the MDT logging measurement to the OAM refers to that, the eNB does not parse the result of the MDT logging measurement, and that the eNB non-transparently forwards the result of the MDT logging measurement to the OAM refers to that, the eNB may obtain useful data in the result of the MDT logging measurement.

506: The MDT logging data server analyzes the result of the MDT logging measurement, where the result of the MDT logging measurement is transferred by the eNB, so as to locate a reason for a network problem.

In the technical solutions according to the embodiments of the present invention, a commercial UE in an existing network may be utilized to assist in locating the network problem, thus reducing a DT overhead; when the UE is selected to send the MDT logging measurement configuration information, a friendly manner is adopted, and power consumption of the UE and fairness for using the UE to perform the MDT logging measurement are taken into account when the UE is selected; and the idle UE is enabled to perform the MDT logging measurement, and the idle UE is fully utilized to perform the MDT logging measurement, thus locating the problem in the network.

Persons of ordinary skill in the art should understand that all or part of the processes of the method according to the foregoing embodiments may be implemented by a program instructing relevant hardware. The program may be stored in a computer readable storage medium. When the program is executed, the processes of the method according to the foregoing embodiments are performed. The storage medium may be a magnetic disk, an optical disk, a Read-Only Memory (ROM), or a Random Access Memory (RAM).

The objectives, technical solutions, and beneficial effects of the present invention are described in further detail through the foregoing specific embodiments. It should be understood that the foregoing descriptions are merely specific embodiments of the present invention, but not intended to limit the protection scope of the present invention. Any modification, equivalent replacement, or improvement made without departing from the spirit and principle of the present invention shall fall within the protection scope of the present invention.

What is claimed is:

1. A method for Minimizing Drive Test (MDT) logging measurement configuration, comprising:
generating MDT logging measurement configuration information, wherein the MDT logging measurement configuration information comprises an identifier associated with a measurement objective different from one or more MDT logging measurements to be taken, and wherein the MDT logging measurement configuration information further comprises a report triggering condition instructing a User Equipment (UE) to store a result of the MDT logging measurement and perform reporting according to the report triggering condition, wherein the report triggering condition is determined according to the UE being active or idle, wherein the MDT logging measurement configuration information further comprises a measurement stop condition that is one of a new measurement configuration or an instruction to terminate the MDT logging measurements due to a load factor; and sending the MDT logging measurement configuration information to the UE, which is an active UE or an idle UE, according to a predetermined rule, wherein the UE is selected according to version information of the UE received through radio resource control (RRC) signaling indicating that the UE has a version after a long term evolution (LTE) protocol R9, charge level information of the UE received through the RRC signaling indicating a charge level of the UE is above a predetermined level, measurement state information of the UE indicating that the UE is not performing MDT logging measurement, and report history information of the UE indicating that the UE has fewer MDT logging measurement reports than another UE, wherein the MDT logging measurement information is sent, when the UE is the active UE in an RRC protocol connection reconfiguration message through a Dedicated Control Channel (DCCH).

2. The method according to claim 1, wherein the generating the MDT logging measurement configuration information comprises:
generating a network performance problem value according to current network performance; and
generating the MDT logging measurement configuration information according to the network performance problem value.

3. The method according to claim 1, wherein the predetermined rule comprises:
sending MDT logging measurement configuration information triggered by system capacity optimization and/or channel performance optimization to the active UE.

4. The method according to claim 1, wherein the sending the MDT logging measurement configuration information comprises:
sending the MDT logging measurement configuration information to the UE, when the UE is the idle UE, on the DCCH by paging the idle UE, or sending the MDT logging measurement configuration information to the UE, when the UE is the idle UE, through a Broadcast Control Channel (BCCH).

5. The method according to claim 1, further comprising receiving a result of the MDT logging measurement, wherein the result of the MDT logging measurement is reported by the UE, and sending the result of the MDT logging measurement to an MDT logging data server so as to enable the MDT logging data server to locate a network problem.

6. The method according to claim 1, wherein the MDT logging measurement configuration information comprises:
a measurement triggering condition, a measurement variable, and a report variable.

7. The method according to claim 6, wherein the measurement triggering condition comprises periodical triggering or event triggering;
wherein the measurement variable comprises at least one following item: measurement time, a UE location, Reference Signal Received Power (RSRP), a Reference Signal Strength Indicator (RSSI), a UE speed, a UE ID, a Cell-Radio Network Temporary Identifier (C-RNTI) which is allocated by a network cell to the UE, power of a UE emission preamble, the number of Random Access Channel (RACH) attempt times, an RACH failure reason, the number of UpLink Packet Data Convergence Protocol Service Data Units (UL PDCP SDUs) lost before scheduling, a maximum length/average length of a Service Data Unit (SDU) sequence, a maximum delay of SDU scheduling, the number of UL PDCP SDU attempts/successful transmission, a cell search delay, user plane interruption time during handover, an indication that preamble emission power reaches the maximum, an access delay, preamble emission power, a contention resolution indication, path loss estimation, the number of contention resolution times, the number of non-RACH response times, and backoff time; and
wherein the report variable comprises at least one following item: the number of event occurrence times, an event occurrence reason, measurement time, a UE location, RSRP, an RSSI, a UE speed, a UE ID, a C-RNTI, power of a UE emission preamble, the number of RACH attempt times, an RACH failure reason, the number of UL PDCP SDUs lost before scheduling, a maximum length/average length of an SDU sequence, a maximum delay of SDU scheduling, the number of UL PDCP SDU attempts/successful transmission, a cell search delay, user plane interruption time during handover, an indication that preamble emission power reaches the maximum, an access delay, preamble emission power, a contention resolution indication, path loss estimation, the number of contention resolution times, the number of non-RACH response times, and backoff time.

8. A non-transitory computer-readable storage medium having a program recorded thereon, wherein the program includes instructions that, when executed, cause a processor to implement the method of claim 1.

9. A system side device, comprising:
a processor; and
a non-transitory computer-readable storage medium storing a program to be executed by the processor, the program including instructions to:
generate Minimizing Drive Test (MDT) logging measurement configuration information, wherein the MDT logging measurement configuration information comprises a logging measurement identifier of a measurement objective, wherein the measurement objective is separate from MDT logging measurements, and wherein the MDT logging measurement configuration information further comprises a report triggering condition instructing a User Equipment (UE) to store a result of the MDT logging measurement and perform reporting according to the report triggering condition, wherein the report triggering condition is determined according to the UE being active or idle, wherein the MDT logging measurement configuration information further comprises a measurement stop condition that is one of a new measurement configuration or an instruction to terminate the MDT logging measurements due to a load factor; and
a sending unit, configured to send the MDT logging measurement configuration information to the UE, which is an active UE or an idle UE, according to a predetermined rule, and send the MDT logging measurement information to the UE, when the UE is the active UE, in a radio resource control (RRC) protocol connection reconfiguration message through a Dedicated Control Channel (DCCH), wherein the UE is selected according to version information of the UE received through the RRC signaling indicating that the UE has a version after a long term evolution (LTE) protocol R9, charge level information of the UE received through the RRC signaling indicating a charge level of the UE is above a predetermined level, measurement state information of the UE indicating that the UE is not performing MDT logging measurement, and report history information of the UE indicating that the UE has fewer MDT logging measurement reports than another UE.

10. The system side device according to claim 9, wherein the instructions to send the MDT logging measurement configuration information to the UE comprise instructions to generate a network performance problem value according to current network performance, and generate the MDT logging measurement configuration information according to the network performance problem value.

11. The system side device according to claim 9, wherein the instructions to send the MDT logging measurement configuration information to the UE comprise instructions to perform at least one of:
send MDT logging measurement configuration information triggered by system capacity optimization and/or channel performance optimization to the active UE.

12. The system side device according to claim 9, wherein the processor and the non-transitory computer-readable storage medium are integrated into one of an Evolved Node B (eNB), a network performance monitoring node, and an entity independently existing in a network; and
wherein the sending unit is integrated in one of an eNB, a network performance monitoring node, and an entity independently existing in a network.

13. A Minimizing Drive Test (MDT) logging measurement method, comprising:
receiving, by a User Equipment (UE), MDT logging measurement configuration information, wherein the MDT logging measurement configuration information comprises a logging ID that identifies a measurement objective, wherein the MDT logging measurement configuration information further comprises a report triggering condition instructing the UE to store a result of an MDT logging measurement and perform reporting according to the report triggering condition, wherein the report triggering condition is determined according to the UE being active or idle, wherein the UE is selected according to version information of the UE received through radio resource control (RRC) signaling indicating that the UE has a version after a long term evolution (LTE) protocol R9, charge level information of the UE received through the RRC signaling indicating a charge level of the UE is above a predetermined level, measurement state information of the UE indicating that the UE is not performing MDT logging measurement, and report history information of the UE indicating that the UE has fewer MDT logging measurement reports than another UE, and wherein, when the UE is in an active state, the MDT logging measurement information is received in a radio resource control (RRC) an RRC protocol connection reconfiguration message through a Dedicated Control Channel (DCCH), wherein the MDT logging measurement configuration information further comprises a measurement stop condition that is one of a new measurement configuration or an instruction to terminate the MDT logging measurements due to a load factor;
performing, by the UE, the MDT logging measurement according to the MDT logging measurement configuration information, storing and reporting a result of the MDT logging measurement if the UE is active according to the report triggering condition, wherein the performing the MDT logging measurement performs one or more measurements that are identified separately from the logging ID that identifies the measurement objective; and
performing, by the UE, the MDT logging measurement according to the MDT logging measurement configuration information, and storing a result of the MDT logging measurement if the UE is idle.

14. The method according to claim 13, wherein the performing, by the UE, the MDT logging measurement according to the MDT logging measurement configuration information comprises:
storing, by the UE, the MDT logging measurement configuration information locally, and performing the MDT logging measurement if MDT logging measurement is not started; and
performing one of:
using, by the UE, the received MDT logging measurement configuration information instead of old MDT logging measurement configuration information, and performing the MDT logging measurement; or
applying the received MDT logging measurement configuration information to perform MDT logging measurement after a current measurement period of the old MDT logging measurement configuration information ends; or
applying the received MDT logging measurement configuration information to perform MDT logging measurement after measurement by using the old MDT logging measurement configuration information ends if the MDT logging measurement is started.

15. The method according to claim 13, wherein the report triggering condition is a report triggering condition selected from a first group of report triggering conditions if the UE is active, wherein the report triggering condition is a report triggering condition selected from a second group of report triggering conditions if the UE is idle, and wherein the first group of report triggering conditions is different from the second group of report triggering conditions.

16. The method according to claim 13, further comprising:
when the UE is active, if the UE has no storage space, or the MDT logging measurement configuration information has the measurement stop condition, or the UE decides to stop measurement, or a charge level of the UE is lower than a preset threshold, stopping, by the UE, reporting the result of the MDT logging measurement; and
when the UE is idle, if the UE has no storage space, or the MDT logging measurement configuration information has the measurement stop condition, or the UE decides to stop measurement, or a charge level of the UE is lower than a preset threshold, stopping, by the UE, storing the result of the MDT logging measurement.

17. A User Equipment (UE), comprising:
a receiver configured to receive Minimizing Drive Test (MDT) logging measurement configuration information, wherein the MDT logging measurement configuration information comprises an identifier that identifies a MDT logging objective separate from an MDT logging measurement, wherein the MDT logging measurement configuration information further comprises a report triggering condition instructing the UE to store a result of the MDT logging measurement and perform reporting according to the report triggering condition, wherein the report triggering condition is determined according to the UE being active or idle, wherein the UE is selected according to version information of the UE received through radio resource control (RRC) signaling indicating that the UE has a version after a long term evolution (LTE) protocol R9, charge level information of the UE received through the RRC signaling indicating a charge level of the UE is above a predetermined level, measurement state information of the UE indicating that the UE is not performing MDT logging measurement, and report history information of the UE indicating that the UE has fewer MDT logging measurement reports than another UE, and, when the UE is in an active state, receive the MDT logging measurement information in an RRC protocol connection reconfiguration message through a Dedicated Control Channel (DCCH), wherein the MDT logging measurement configuration information further comprises a measurement stop condition that is one of a new measurement configuration or an instruction to terminate the MDT logging measurements due to a load factor;

a processor; and a non-transitory computer-readable storage medium storing a program to be executed by the processor, the program including instructions to:

judge whether the UE is active or idle;

perform the MDT logging measurement according to the MDT logging measurement configuration information;

store a result of the MDT logging measurement; and report the result of the MDT logging measurement according to the report triggering condition and in response to judging that the UE is active.

18. The UE according to claim 17, wherein the instructions to store a result of the MDT logging measurement include instructions to:

store the MDT logging measurement configuration information if the MDT logging measurement is not started; and use the received MDT logging measurement configuration information instead of old MDT logging measurement configuration information if the MDT logging measurement is started.

19. The UE according to claim 18, wherein the instructions to perform the MDT logging measurement include instructions to perform at least one of:

perform the MDT logging measurement after a current measurement period of the old MDT logging measurement configuration information ends; or perform the MDT logging measurement after the measurement by using the old MDT logging measurement configuration information ends if the MDT logging measurement is started.

20. The UE according to claim 17, wherein the program further includes instructions to perform at least one of:

stop the reporting of the result of the MDT logging measurement, or stop the storing the result of the MDT logging measurement.

* * * * *

UNITED STATES PATENT AND TRADEMARK OFFICE
CERTIFICATE OF CORRECTION

PATENT NO. : 9,973,954 B2
APPLICATION NO. : 13/328627
DATED : May 15, 2018
INVENTOR(S) : Johan Johansson It is certified that error appears in the above-identified patent and that said Letters Patent is hereby corrected as shown below:

In the Claims

In Column 13, Lines 53-54, Claim 13, delete "in a radio resource control (RRC) an RRC protocol connection" and insert --in an RRC protocol connection--.

Signed and Sealed this
Seventeenth Day of July, 2018

Andrei Iancu
*Director of the United States Patent and Trademark Office*